United States Patent [19]

Carter et al.

[11] 3,819,913

[45] June 25, 1974

[54] DETECTION OF EOSINOPHIL CELLS ON A BLOOD SMEARED SLIDE

[75] Inventors: Charles N. Carter; Burton H. Sage, both of Raleigh, N.C.

[73] Assignee: Corning Glass Works, Corning, N.Y.

[22] Filed: May 21, 1973

[21] Appl. No.: 362,426

[52] U.S. Cl. .............. 235/92 PC, 235/92 R, 356/39
[51] Int. Cl. .......................................... G06m 11/02
[58] Field of Search .................... 235/92 PC; 356/39

[56] References Cited

UNITED STATES PATENTS

| | | | |
|---|---|---|---|
| 2,817,265 | 12/1957 | Covely | 235/92 PC |
| 3,315,229 | 4/1967 | Smithline | 235/92 PC |

*Primary Examiner*—Paul J. Henon
*Assistant Examiner*—Joseph M. Thesz, Jr.
*Attorney, Agent, or Firm*—Richard E. Kurtz; Walter S. Zebrowski

[57] ABSTRACT

In an automated blood cell identification system a high resolution microscope and a split path optical system produce a blue filtered image and a yellow filtered image of an eosinophil blood cell. These images are converted into digital histograms representing the optical density of points in each image. The histograms are compared one to the other. An eosinophil cell is identified if the optical density of the histogram of the blue image is greater than the optical density of the yellow image.

10 Claims, 6 Drawing Figures

DETECTION OF EOSINOPHIL CELLS ON A BLOOD SMEARED SLIDE

BACKGROUND OF THE INVENTION

This invention relates to automated blood cell identification apparatus and more particularly to the identification of eosinophil cells in such apparatus.

In the analysis of blood samples, the blood is smeared on a laboratory slide and the smear is stained. By counting the leukocytes on the stained smear, laboratory technicians perform what is referred to as a white blood cell differential. Automation of this differential has significant economic impact because the differential is performed so frequently at every hospital. A thesis by J.W. Bacus, "An Automated Classification of the Peripheral Blood Leukocytes by Means of Digital Image Processing," University of Illinois, Chicago, 1971, describes one automated system.

In a system developed by my co-employees, a scanning unit (in this case a T.V. camera) linearly sweeps a vidicon target subjected to intense illumination which passes through the smeared slide. Such a system is described in copending application Ser. No. 353,004.

SUMMARY OF THE INVENTION

In accordance with this invention an eosinophil blood cell is identified if the histogram of a blue filtered image of the cell is greater than the histogram of a yellow filtered image of the cell. A histogram represents the number of image points of each optical density. These histograms exhibit a minimum number at an optical density corresponding with the threshold with the optical density of the cytoplasm and the nucleus in a blood cell. For other blood cell types the optical density of the blue filtered image is approximately the same as that of the yellow filtered image above this minimum point. However, we have discovered that because the eosinophil cell has red granules in the nucleus, the histogram of the blue filtered image above the minimum exhibits a greater optical density than the histogram of the yellow filtered image. By comparing one histogram to another it is possible to distinguish the eosinophil cells from the other cells in a blood smear.

A high resolution microscope, an optical filtering system, a television camera and digital computing means are interconnected to automatically perform the analysis in accordance with this invention.

The foregoing and other objects, features and advantages of the invention will be better understood from the following more detailed description and appended claims.

DESCRIPTION OF THE DRAWINGS

FIGS. 3A and 3B show the digital computing apparatus which carries out this invention.

DESCRIPTION OF A PARTICULAR EMBODIMENT

Figure 1:
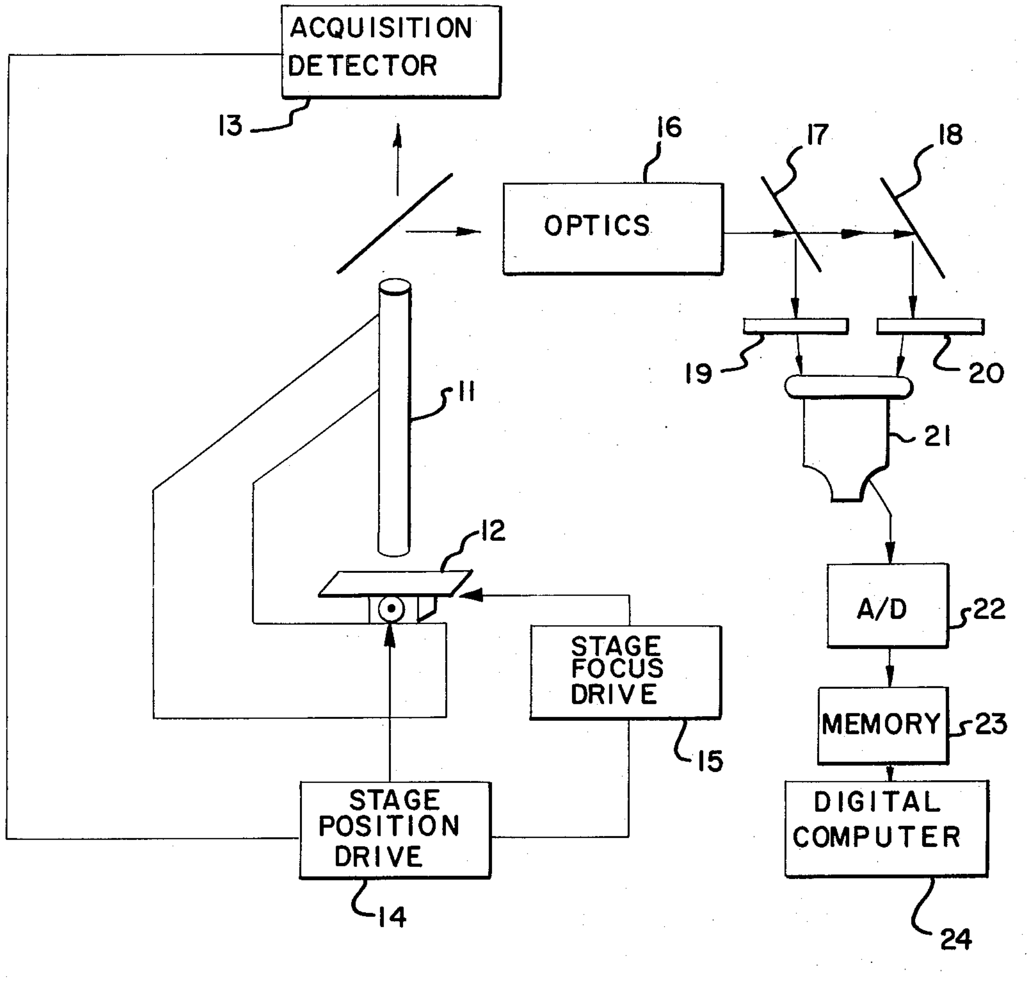
FIG. 1 shows a block diagram of the automated blood cell identification system.

In FIG. 1 the high resolution microscope 11 forms an optical image of a blood cell on the blood smeared slide 12. Acquisition detection optics 13, stage position drive 14 and stage focus drive 15 are provided to focus the microscope on a single blood cell. Standard optics 16 are followed by an optical system which includes beam splitters 17 and 18 to produce a dual split optical path. A blue filter 19 is in one path and a yellow filter 20 is in the other path.

A detector 21, in this case a vidicon television camera, converts the optical images point by point into a scanned electronic charge distribution representing the optical transmission of the points in each image.

The output of vidicon camera 21 is applied to an analog to digital converter 22 which produces digitized words representing the optical density of points in each image. These digital words are stored in the memory 23.

What has been described thus far is an automated blood cell identification system. The copending application Ser. No. 353,004, filed Apr. 20, 1973 for my coworker Douglas Cotter better describes such a system. The disclosure in that patent application is incorporated herein by reference.

The digital words are transformed into a digitized histogram which is stored in the memory of a general purpose digital computer 24. Normally, manipulation of the digital words will be performed on general purpose digital computer 24. However, a hardware special purpose computer may also be used and such apparatus will be described with reference to FIG. 3.

The system of the aforementioned Cotter patent application produces 12 bit digital words with 6 bits representing a point in the blue image and 7 bits representing a point in the yellow image. A large number of points in each image are successively scanned and the successive digital words represent the optical density of these successive points. As shown in FIG. 3 the 6 bits representing the optical density of a point in the yellow image are set into the register 25 and the 6 bits representing the optical density of the corresponding point in the blue image are set into register 26.

These digital words are decoded in accordance with the level of optical density of the point represented by the word. The digital word in register 25 is decoded by 64 decoders. Only decoders 27–29 are shown. The 6 bits from the register 25 are applied to the decoder 27. If the optical density of the point being decoded is all white, there will be an output pulse from the decoder 27. If the word being decoded is the next level of gray there will be an output of the decoder 28. If the optical density is all black there will be a pulse output from the decoder 29.

Figure 3B:
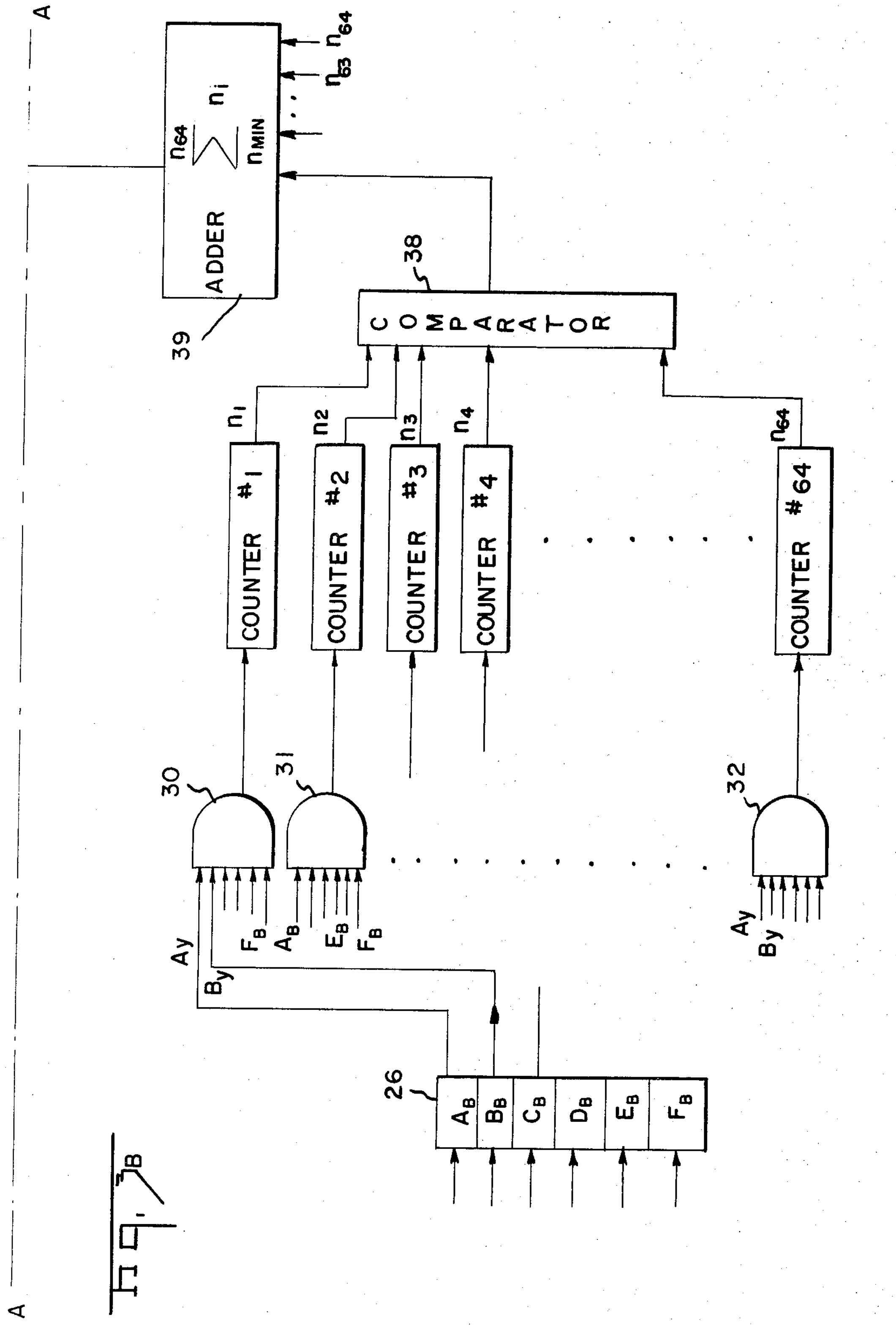

The pulse outputs from each decoder are supplied to counters designated counter No. 1 through counter No. 64. FIG. 3B shows similar circuitry for converting six bit words to counts of the number of points having different levels of optical density. Sixty-four decoders, including decoders 30–32, produce pulse outputs for each point having one of the sixty-four density levels. Counters No. 1-No. 64 count the pulses from each of the decoders.

Figure 2A:
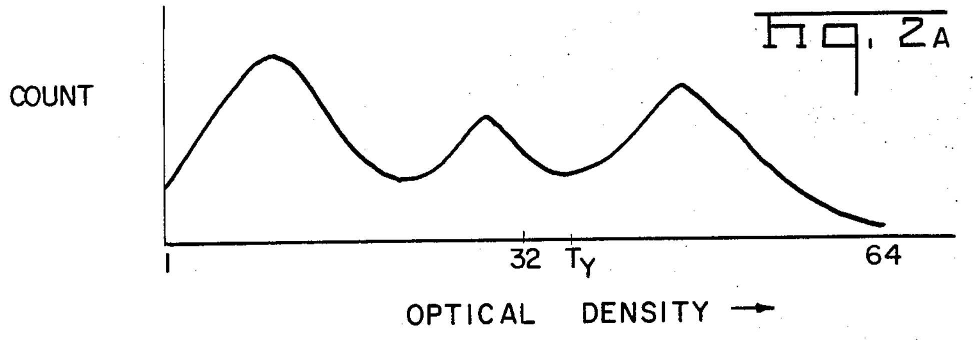
FIG. 2A shows a histogram of a yellow filtered image of an eosinophil cell.

FIG. 2A is a histogram contained in digital form in the counters No. 1 - No. 64 of FIG. 3A. The counter numbers are along the abscissa whereas the count in each counter is the abscissa. The count is the number of points in each image having each of the sixty-four different detected levels of optical density.

Figure 2B:
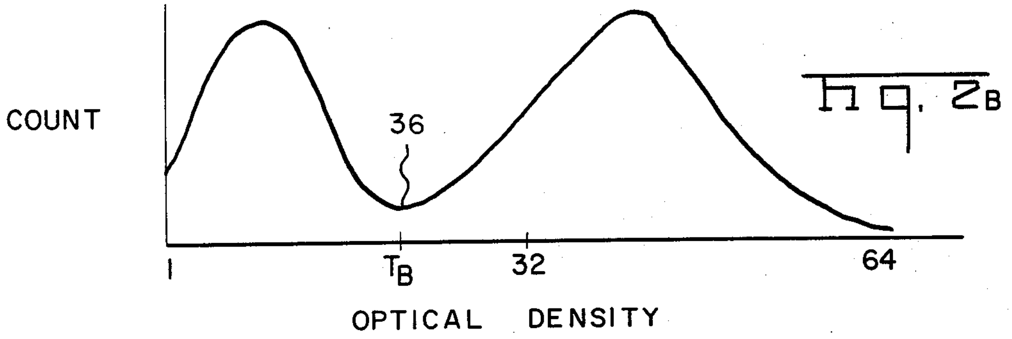
FIG. 2B shows the histogram of a blue filtered image of an eosinophil cell.

Similarly, FIG. 2B is a histogram representing the outputs of counters No. 1 - No. 64 in FIG. 3B. FIG. 2B is a histogram of the blue image.

Figure 4:
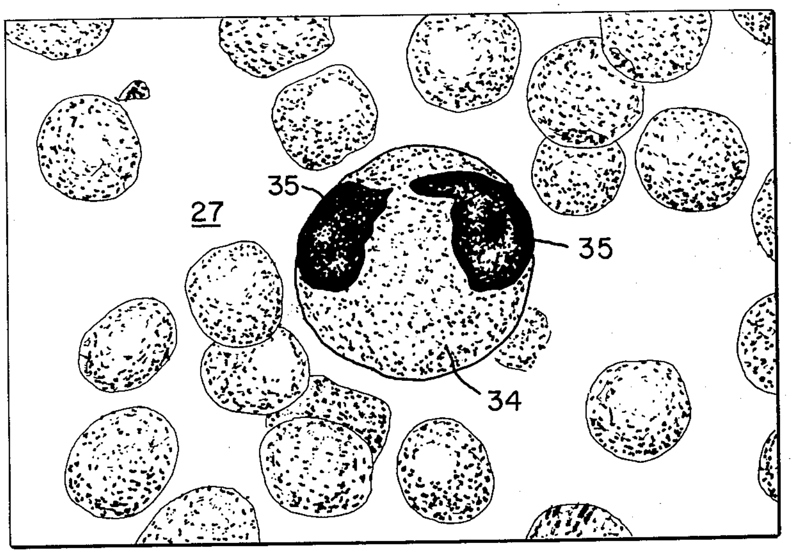
FIG. 4 shows an eosinophil cell.
Figure 7A:
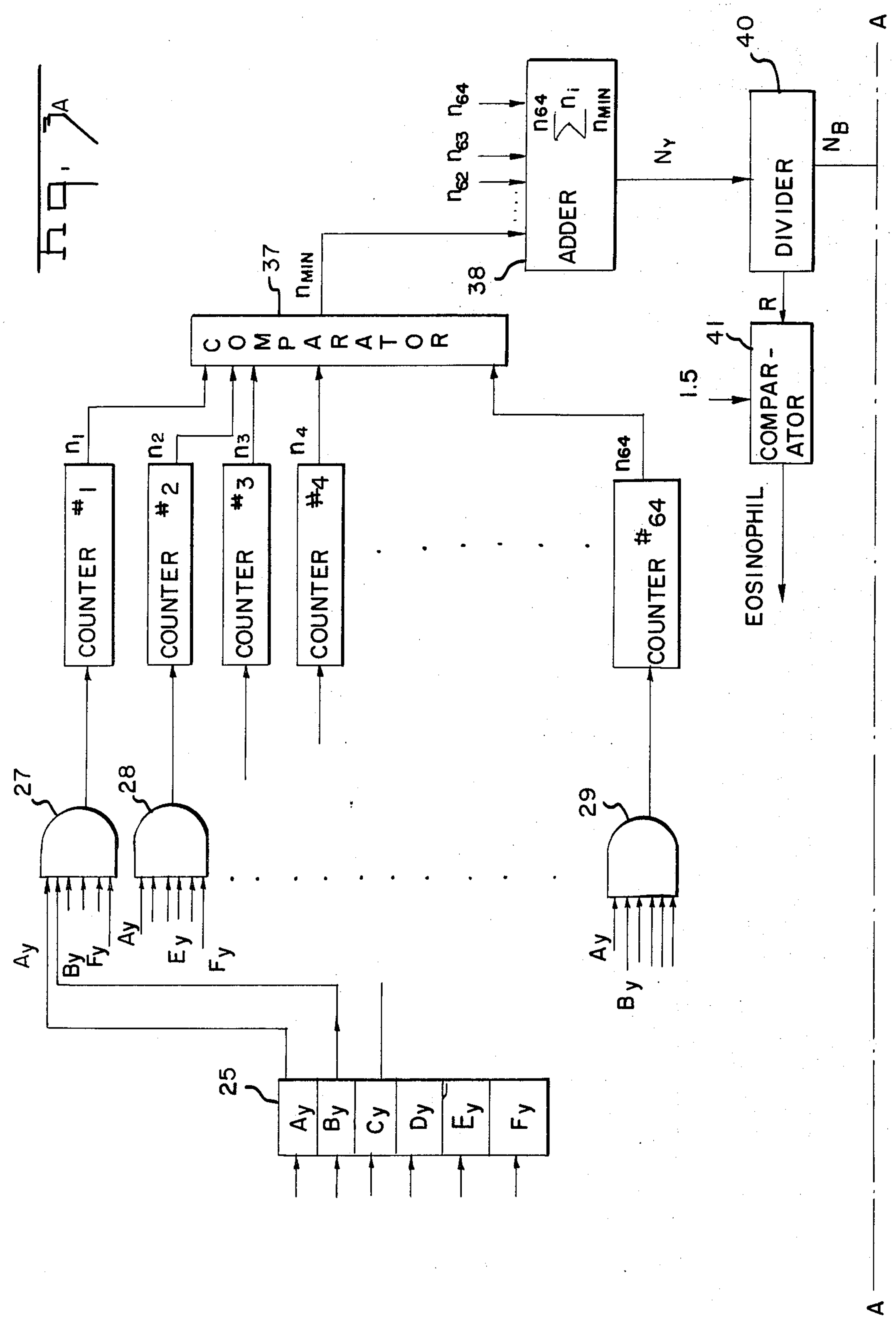

We have found that a significant indicator of the eosinophil cell is a very dense image produced through the blue filter. FIG. 4 depicts an eosinophil cell. Reference numeral 33 denotes the background, reference numeral 34 is the cell cytoplasm and reference numeral 35 is the nucleus of the cell. The cytoplasm has red granules and the nucleus is dark and segmented. Because of this, the blue image histogram above the minimum point 36 (FIG. 2B) is very much denser than the yellow filtered histogram. The minimum point 36 corresponds generally with the threshold optical density of the cytoplasm and the nucleus. To the left of the point 36 generally represents the number of lighter optical density points of the background. We have found that in eosinophil cells the optical density above this minimum point is significantly greater for the blue image than for the yellow image. The number of points in the yellow histogram having an optical density greater than $T_y$ is denoted $N_y$ and can be described as:

$$N_y = \sum_{i=T_y}^{n} f_y(i)$$

where $f_y(i)$ is the number of points having a given optical density $i$ is the index of optical density levels, and $N$ is the total number of optical density levels which are detected. In the above example $N$=64. Similarly, for the blue image:

$$N_b = \sum_{i=T_b}^{n} f_b(i)$$

The ratio of the color images $R = N_b/N_y$ is in the range 1.5–2.5 for eosinophils. For other cell types (which do not have red stained granules) the ratio $R$ is about 0.9–1.2.

The ratio provides a consistent detection of the eosinophil presence in a peripheral blood smear stained with Wright's stain.

The circuitry of FIGS. 3A and 3B determines this ratio. Comparator 37 compares the count in each of counters No. 1 through No. 64 to determine which counter has the minimum count. For example, assume that counter No. 34 has the lowest value. The address of counter No. 34 is delivered to the adder 38. Adder 38 sums the contents of counters No. 34 through No. 64. The output of adder 38 is the yellow image sum $N_y$.

In a similar manner, comparator 38 determines the minimum count in the counters for the blue image. Assume that counter No. 22 has the minimum count. The address of counter No. 22 is delivered to the adder 39 which forms a sum of the counts in counters No. 22 through No. 64. This forms the blue image sum $N_b$ which is applied to divider 40. Divider 40 produces the ratio of the blue image sum $N_b$ and the yellow image sum $N_y$. The ratio signal will normally be in the range of 1.5–2.5 for an eosinophil cell. It will be approximately one for all other cells. The output comparator 41 determines whether the ratio signal exceeds the threshold of 1.5. If it does, it produces an output indicating an eosinophil cell.

While a particular embodiment has been shown and described various modifications are within the true spirit and scope of the invention. The appended claims are, therefore, intended to cover such modifications.

What is claimed is:

1. Automated apparatus for identifying an eosinophil blood cell on a blood smeared slide comprising:
- a high resolution microscope forming an optical image of a blood cell on said slide,
- two filters having different color characteristics,
- an optical system having a dual split optical path with one of said filters in each path, said eosinophil cell producing different optical density images from said two filters,
- a detector for converting the optical images from each path into electrical signals,
- an analog to digital converter producing digitized words representing the optical density of points in each image,
- means for generating optical density histograms of the two images from said two different filters,
- a comparator for comparing one histogram to the other, and
- means for producing an output indicating an eosinophil cell if one histogram is optically denser than another.

2. The apparatus recited in claim 1 wherein said means for generating optical density histograms includes:
- counters for counting the number of points in each image having a particular optical density, said counters producing a histogram exhibiting a minimum number representing an optical density corresponding generally with the threshold of the cytoplasm and the nucleus of said eosinophil cell,
- a minimum determining comparator, the outputs of said counters being applied to said minimum determining comparator, and
- ratio circuitry forming the ratio of the sum of the counts in the counters above the minimum in each histogram, said means for producing an output indication being responsive to the output of said ratio circuit when said output is greater than one.

3. The apparatus recited in claim 1 wherein one filter is a blue filter producing a blue filtered image and the other filter is a yellow filter producing a yellow filtered image, the eosinophil cell having red granules in the nucleus, which, when imaged on said filters projects an optically brighter image through said yellow filter than through said blue filter.

4. The apparatus recited in claim 3 wherein said means for generating optical density histograms comprises:
- decoding means, each of said digitized words being applied to said decoding means which produce different outputs in accordance with the optical density represented by each digital word, and
- first and second sets of counters, the outputs of the decoders for said blue filtered image being applied to one set of counters and the outputs of the decoding means for the yellow filtered image being applied to the other set of counters, said counters producing counts representing the number of digitized words in each image representing an optical density of a particular level.

5. The apparatus recited in claim 4 wherein said means for comparing comprises:

a minimum count comparator comparing all counts in one set of counters to determine a minimum, first and second summing means, all of the counts above a minimum in one set of counters being applied to the first summing means to form a blue filtered sum, and all of the counts above said minimum in the second set of counters being applied to the second summing means to form a yellow filtered sum, a divider, said blue filtered sum and said yellow filtered sum being applied to said divider to produce a ratio signal, and an output comparator, said ratio being applied to said output comparator, said output comparator producing an output indication if said ratio signal is greater than one.

6. The new use of automated apparatus for identifying blood cell types on a blood smeared slide, said apparatus being of the type comprising:

a high resolution microscope forming an optical image of a blood cell on said slide, two filters having different color characteristics, an optical system having a dual split optical path with one of said filters in each path, a detector for converting the optical images from each path into electrical signals, an analog to digital converter producing digitized words representing the optical density of points in each image, and digital computing means for storing and automatically processing digital words, said new use being the identification of the eosinophil cell which produces different optical density images from said two filters comprising:

generating optical density histograms of the two images from said two different filters, comparing said histograms one to the other, and producing an output indicating an eosinophil cell if one histogram is optically denser than another.

7. The new use of claim 6 wherein one filter is a blue filter producing a blue filtered image and the other is a yellow filter producing a yellow filtered image, the eosinophil cell having red granules in the cytoplasm which, when imaged on said filters projects an optically brighter image through said yellow filter than through said blue filter.

8. The new use recited in claim 6 wherein each histogram indicates the number of points in each image having a particular optical density, each histogram exhibiting a minimum number at a particular optical density corresponding generally with the optical density threshold of the cytoplasm and the nucleus of said cell, the step of comparing one histogram to another including:

determining the minimum in each histogram, and forming the ratio of the histogram from one filter above its minimum to the histogram from the other filter above its minimum, said output indication being produced when said ratio is greater than one.

9. The new use recited in claim 6 wherein the step of generating optical density histograms comprises:

decoding each of said digitized words to produce different outputs in accordance with the optical density represented by each digitized word, and counting each different output to produce counts representing the number of digitized words in each image representing an optical density of a particular level.

10. The new use recited in claim 6 wherein the step of comparing comprises:

comparing said counts to determine a minimum, summing all counts above the minimum for the blue filtered image and for the yellow filtered image to form a blue filtered sum and a yellow filtered sum, dividing said blue filtered sum by said yellow filtered sum to produce a ratio signal, said output indication being produced if said ratio is greater than one.

* * * * *